United States Patent [19]

Walker

[11] 4,102,047

[45] Jul. 25, 1978

[54] DENTAL TEACHING DEVICE

[75] Inventor: Barvo N. Walker, Mesquite, Tex.

[73] Assignee: Dentsply Research & Development Corp., Milford, Del.

[21] Appl. No.: 788,218

[22] Filed: Apr. 18, 1977

[51] Int. Cl.² ............................................. G09B 23/28
[52] U.S. Cl. ......................................................... 32/71
[58] Field of Search .................... 32/71, 40 R; 128/2.5

[56] References Cited

U.S. PATENT DOCUMENTS

| 2,256,667 | 9/1941 | Doret | 32/71 |
| 2,674,802 | 4/1954 | Williams | 32/71 |
| 3,753,434 | 8/1973 | Pike et al. | 32/40 R |
| 3,947,967 | 4/1976 | Satake | 32/71 |
| 3,950,852 | 4/1976 | Henning | 32/71 |

Primary Examiner—Louis G. Mancene
Assistant Examiner—John J. Wilson

Attorney, Agent, or Firm—C. Hercus Just

[57] ABSTRACT

A teaching device to acquaint dental students and also patients with endodontic root canal techniques performed by dentists and utilizing an electronic oscillator having a scale reading in electric current measurement and a pair of electrical circuit conductors being connected at one end to the terminals of the oscillator and the opposite ends thereof respectively being connectable to one or more small diameter metal wires which simulate dental reamers and files which are movable in root canal-simulating passages of uniform diameter complementary to that of said wires and formed in a transparent model of a human tooth including a root and cusp thereon and mounted in a transparent enclosure in which the root portion of the tooth extends with the cusp of the model extending above the upper end of the enclosure.

3 Claims, 5 Drawing Figures

U.S. Patent
July 25, 1978
4,102,047
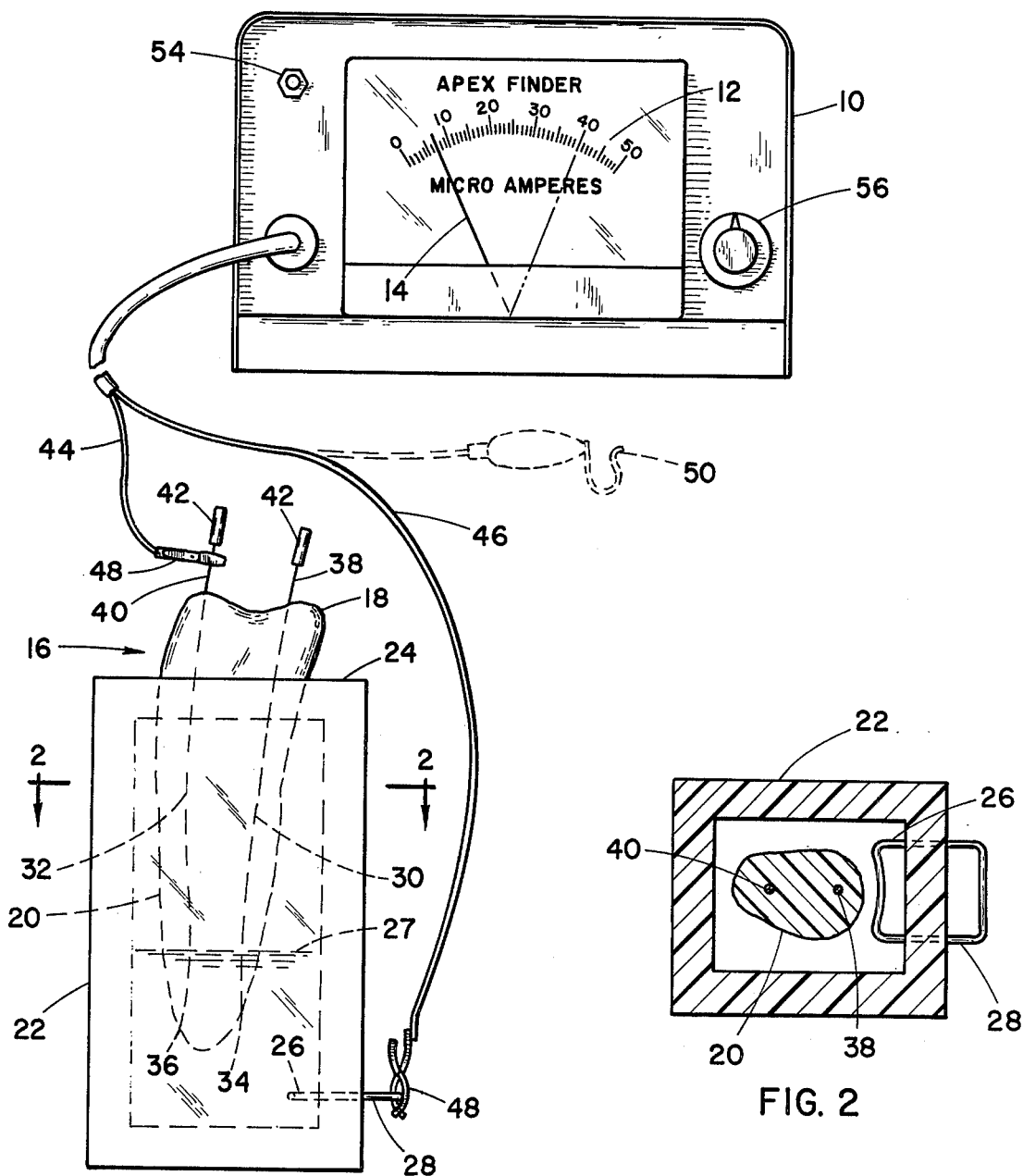
FIG. 1
FIG. 2
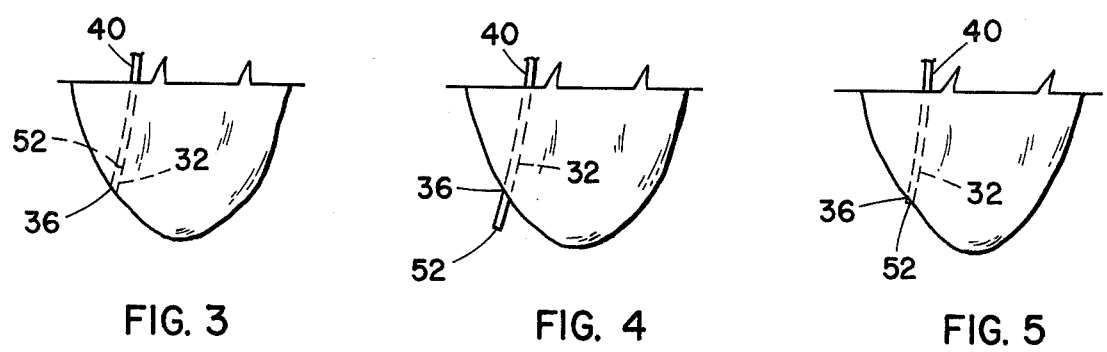
FIG. 3
FIG. 4
FIG. 5

DENTAL TEACHING DEVICE

BACKGROUND OF THE INVENTION

Endodontic Therapy is a specialized form of dental procedure designed to retain a pathologically involved tooth safely and comfortably. The most critical step in assuring success of the endodontic therapy is the accurate determination of the length of the tooth and particularly the tooth root. The length of the tooth establishes the apical extent of instrumentation, adequacy of the primary filling point, and the ultimate apical level of the root canal filling.

Failure to accurately determine the length of the tooth may lead to overinstrumentation and overfilling with increased incidence of acute apical periodontitis and pain. One might also expect an increased incidence of failure. Failure to determine the length of the tooth may also lead to incomplete instrumentation and underfilling which can also lead to an increased incidence of failure because of apical percolation, ledge formation, persistant pain and discomfort, and a periapical pathological lesion.

The requirements of a method for determining the length of the teeth are accuracy, ease and readiness of being performed, and ease of the results being confirmed. Some professional operators rely on tactical appreciation of root canal constriction present at the apical end of most teeth. This may be satisfactory for the experienced endodontic specialist but is not suitable for the needs and level of skill of a student or general practitioner who do not accomplish endodontic therapy on a regular basis.

One presently employed method for determining the length of a tooth is known as the Sunada method which employs a device comprising and electroconductometer, with a microammeter, a potentiometer, and two electrodes. Resistance to the passage of an electric current when an instrument introduced into the root canal reaches the apical area should be consistent and equal to a reading of microamperes. Accordingly, the apparatus is calibrated to 40 microamperes and one electrode is attached to the patient's cheek and the other to a root canal instrument. The instrument is gradually introduced to the root canal until the microammeter indicates 40 microamperes. A mark is then made on the blade of the instrument at the incisal edge or cusp of the tooth. The measurement of the distance from the mark to the tip of the instrument corresponds to the length of the tooth.

For purposes of illustrating the efficacy of this technique to a dental student so as to have the student develop reliance upon the method, as well as for purposes of illustrating the technique to a dental patient if desired, the present invention has been developed to provide a visual, readily understandable illustration of the technique by means of a device illustrated on the drawing comprising a part of the present application and by description thereof in the following specification.

SUMMARY OF THE INVENTION

It is the principal object of the present invention to provide a transparent model of the human tooth including the root and cusp thereof and in which said model, which is preferably formed of transparent plastic material, has one or more elongated root canal-simulating passages of uniform diameter extending therein from the cusp to the lower end portion of the root of the tooth models, at least the lower end portion of said tooth model being disposed in a saline solution contained in a transparent enclosure surrounding the root portion of the tooth model and the cusp of the model extending above the upper end of said enclosure in order that small diameter metal wires, simulating dental reamers and files, which are closely complementary in diameter to the root canal-simulating passages, are slideably positioned therein. The upper ends of said wires extend above the upper end of the cusp of the tooth model for manual manipulation and for connection of an electrical circuit conductor which is connected at one end to an electronic oscillator having a scale reading in electric current measurements and another electrical circuit conductor, which also is connected at one end to said oscillator, is connectable to a metal ground element extending through a wall of said enclosure into the saline solution and having an exterior terminal end, whereby as the wire is moved within the passage in the tooth model therefor, the position of the lower end of the wire with respect to the lower end of said passage will produce different readings upon the dial of the oscillator but a predetermined reading on the scale will correspond to the exact position of the lower end of the wire with respect to the lower end of the passage and thereby correspond to the length of the tooth and particularly the apical extent of instrumentation which should occur for purposes of performing endodontic therapy, including the filling of a root canal with suitable filling material.

It is another object of the invention to provide said wires, which simulate dental reamers and files, in the form of relatively stiff wire and the upper ends of said wires having finger engageable handle elements to facilitate manipulation of the wires within the passages therefor in said model, said wires having a greater length than said passages.

It is a further object of the invention to provide said electrical circuit conductors in the form of a pair of conductors, each respectively connected at one end to the positive and negative terminals of the oscillator, and electrical contact clips respectively being affixed to the opposite ends of said conductors for the purpose of one of said conductors being adapted to be clipped to one of said wires in a passage in said tooth model and the clip on the other conductor being clipped to the metal ground element in said enclosure to provide a complete electrical circuit between the tooth model and said electronic oscillator.

Details of the foregoing objects and of the invention, as well as other objects thereof, are set forth in the following specification and illustrated in the accompanying drawing comprising a part thereof.

DESCRIPTION OF THE DRAWING

FIG. 1 is a vertical elevation of a tooth model, electronic oscillator, and electrical circuit conductors shown in operative relationship and illustrating the principles of the present invention.

FIG. 2 is a transverse sectional view of the tooth model and an enclosure therefor as seen on the line 2—2 of FIG. 1.

FIGS. 3, 4 and 5 are fragmentary side elevations showing the lower portion of the tooth model illustrated in FIGS. 1 and 2 and respectively showing different positions of a metal wire positioned within a complementary canal-simulating passage in the root portion of the tooth model, said views respectively illustrating the lower end of the wire above the lower end of the passage, the lower end of the wire projecting beyond the lower end of the passage, and the lower end of the wire located exactly at the lower end of the passage which corresponds to the desired position for purposes of measuring the length of the tooth and particularly the length of the root canal-simulating passage therein.

DETAILED DESCRIPTION

The principle object and purpose of the present invention is to provide a device simulating a human tooth, on an enlarged scale so as to be readily observable by either a dental student, the teacher, as well as dental patients in the event the dentist desires to illustrate to a patient the technique that he proposes to employ incident to performing a periodontal technique which includes in the actual application thereof to a patients tooth, the introduction of a dental reamer or file, which is somewhat of the nature of a very small diameter broach, into the root canal of a tooth. The object of such technique, basically, is to determine the length of the tooth and, more specifically, the length of the root canal in the tooth in order that the dental tool by which the nerve is extracted from the canal will not be inserted beyond the lower end of the canal but, equally important, the tool will actually be inserted for the full length of the canal in order to insure the removal of all of the nerve. Similarly, it is important to know the length of the tooth for purposes of treating the canal following removal of the nerve and prior to introducing filling material into the canal which has been prepared for the reception of such material. Essentially, therefore, the technique is to prevent either overinstrumentation and overfilling as well as to prevent imcomplete instrumentation and underfilling.

Periodontal techniques of the type referred to above usually are undertaken while the tooth has been desensitized, such as by the use of various preparations sold under such names as "Novocain", which is injected into the gum adjacent the tooth to be treated. Nevertheless, certain patients desire to have an understanding of what technique is to be employed by the dentist and the present invention affords ready means for illustrating this. More importantly however, the present invention is especially useful in teaching periodontal technique such as measuring the length of the tooth so as to prevent either overinstrumentation or underinstrumentation. Details of the structure comprising the present invention are as follows.

Referring to FIG. 1, there is illustrated therein a commercial type of electronic oscillator 10 which is connected to a suitable source of current. Actually, this oscillator is an electroconductometer that includes a microammeter, a potentiometer and two electrodes. The resistance of the passage of an electric current when an instrument is introduced into the root canal reaches the apical area to be consistant and equal to forty microamperes. The scale 12 on the oscillator 10 indicates such microamperes and the needle 14 which operates relative to the scale 12 is responsive to the amount that a dental reamer or file is introduced into the root canal to the apical extent of instrumentation, namely, to the lower end of the root canal. This is the procedure undertaken in the actual performance of periodontal techniques for measuring the length of the tooth and particularly the root canal. Accordingly, the present invention avails itself of the use of the electronic oscillator 10 which is the same type as employed by a dentist in performing the actual technique on the tooth of a patient.

For purposes of permitting visualization of what actually occurs in the aforementioned periodontal technique utilized to determine the length of the tooth, the present invention employs a simulated tooth model 16 which preferably is formed from a transparent plastic, such as methylmethacrylate, which is molded on a greatly enlarged scale, such as of the order of 2½ or 3 inches in length and includes a cusp 18 and a root 20. About the lower ⅔ of the tooth model 16 is encased within an enclosure 22 which is also formed from transparent material such as a suitable plastic of the type from which the tooth model 16 is formed. The enclosure includes a top portion 24 which surrounds the upper portion of the tooth model 16 but is below the cusp 18. Prior to concluding the formation of the enclosure 22, a saline solution 25 is introduced into the lower portion of the enclosure and extends to an upper level which is above and surrounds the lower portion of the root 20 of the tooth model 16 as shown in exemplary manner in FIG. 1. In forming the enclosure 22, a metal ground element 26, which has an outer, exposed portion 28, is molded into the sidewall of the enclosure 22 which supports the ground element in a leak-proof manner.

The tooth model 16 when molded is formed with one or more elongated root canal-simulating passages 30 and 32 formed therein which are of uniform diameter throughout. As shown in FIG. 1, said passages extend from the cusp 18 of the tooth model 16 to approximately the lower end of the root 20. It will be understood also that while two such passages are shown in FIG. 1, this number is arbitrary and there may be less than or more than two passages, if desired. The essential feature is that the lower ends 34 and 36 shall be close to the lower end of the root 20 so as to simulate actual natural conditions in the tooth roots of a human being.

The passages 30 and 32 are formed by employing one or more, preferably steel wires. In FIG. 1, it will be seen that two such wires 38 and 40 are illustrated. These wires are complementary in diameter to the diameter of the passages 30 and 32 which are to be formed in the tooth model 16. Said wires also are longer than the length of the passages 30 and 32 in order that the upper ends thereof may project above the cusp 18 for purposes of finger-engageable handles 42 being attached thereto for purposes of manipulating the wires in a manner described hereinafter. When forming the tooth model 16, the wires 38 and 40 are introduced into the mold at the desired locations and said wires are coated lightly with an appropriate lubricant to permit withdrawal thereof from the molded tooth model 16 after the same has been formed.

As indicated above, the wires 38 and 40 simulate dental reamers or files. In the periodontal technique of measuring the length of a tooth, the wires are introduced into the root canalsimulating passages 30 and 32 to an extent where the lower end of the wires is adjacent the lower ends of the passages 34 or 36. The electronic oscillator 10 is provided with a pair of electrical circuit conductors 44 and 46. They each have a spring clip 48 connected to the outer ends thereof and the opposite ends are connected to appropriate terminals, not shown, within the electronic circuit in the oscillator 10, the details of said circuit not comprising part of the present invention except that the oscillator 10 is employed in the use of the present invention the same as in the practice of actual periodontal techniques such as the measurement of the length of human teeth. When employed in the actual periodontal technique of measuring the length of a human tooth, the conductor 46 is connected to a different type of grounding device which is illustrated in phantom in FIG. 1 and constitutes a lip-engaging spring member 50 by which the circuit is grounded to the individual whose tooth is being measured. For purposes of the present invention however, a clip 48 is substituted for the spring member 50 but otherwise the electronic oscillator 10 is the same as utilized in actual periodontal operations. The clip 48 is connected to the exterior portion of the metal ground element 26 in the enclosure 22, as illustrated in FIG. 1.

For purposes of affording a specific example of the manner in which the present invention functions with respect to the oscillator 10, attention is directed to FIGS. 3, 4 and 5 in which in FIG. 3, it will be seen that the lower end 52 of wire 40 is spaced a short distance from the lower end 36 of the passage 32. When the apparatus is assembled in the manner shown in FIG. 1, this condition will result in the needle 14 being disposed on the scale 12 in the vicinity of the markings 38 or 39 microamperes. When the lower end 52 of wire 40 is projected beyond the lower end 36 of passage 32, as shown in FIG. 4, the needle 14 will be disposed adjacent the scale markings indicating 41 microamperes or possibly even between the markings of 41 and 42 microamperes. However, when the end 52 of the wire 40 is immediatey adjacent the lower end 36 of passage 32, as shown in FIG. 5, the needle 14 will be positioned exactly upon the scale marking 40 to denote 40 microamperes. This marking then will indicate that the position of the lower end 52 of the wire 40 is exactly at the lower end 36 of passage 32 which is the optimum desired position and corresponds to the position of the lower end of an actual dental reamer or file when operating upon the tooth of a human being.

The reading of 40 microamperes is somewhat emperical and arbitrary. However, it has been found to be practical in operating the commercial type of electronic oscillator 10 which is commonly employed by many dentists. To be certain that the scale marking 40 will correspond to the optimum position of the wire 40 within its passage 32, corresponding to the position shown in FIG. 5, the oscillator 10 may be adjusted and calibrated by attaching a clip 48 to a test terminal 54, which is readily accessible on the front face of the oscillator 10 as shown in FIG. 1, that is suitably connected in a circuit thereof to afford the desired result. Calibration of the oscillator 10 also is accomplished by manipulation of the potentiometer knob 56 to dispose the needle 14 opposite the indicia 40 of scale 12 while the calibration is being effected.

From the foregoing, it'll be seen that the present invention may very readily be utilized not only to teach dental students to perform that feature of endodontic therapy which comprises measuring the length of a tooth and especially the root canal thereof, but the device also may be employed to illustrate the technique to dental patients. The device is simple, durable, yet highly effective to produce the desired results. Also, in the foregoing description, while the same has referred only to the manipulation of wire 40 with respect to the tooth model 16, it is to be understood that the same manipulation can apply to any other wires mounted within the tooth model 16, such as the additional wire 38 or any other greater number which may be desired in a demonstrating tooth model.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A teaching device to acquaint dental students with endodontic root canal techniques performed by dentists and comprising in combination:
    (a) an electronic oscillator having a scale reading in electric current measurements,
    (b) a transparent model of a human tooth including root and cusp formed from electrical insulating material in a greatly enlarged size compared to a human tooth,
    (c) a transparent enclosure having a hollow interior into which the root portion of said tooth model extends and the cusp of the tooth model extending above the upper end of said enclosure,
    (d) said tooth model having one or more elongated root canal-simulating passages of uniform diameter therein extending from the cusp to the lower end portion of the root of said tooth model,
    (e) a saline solution in the lower part of said enclosure extending around the lower end of said root at least to the lower ends of said canal-simulating passages,
    (f) small diameter metal wires simulating dental reamers and files and closely complementary in diameter to said canal-simulating passages for slidable movement therein, said wires having a length greater than said passages, one end of said wires extending above the cusp at all times for manual engagement and manipulation of said wires within said passages,
    (g) a metal ground element extending through a wall of said enclosure into said solution and having an exterior terminal end, and
    (h) electrical circuit conductors connectable respectively between said oscillator and one of said metal wires and said ground element, whereby when the lower end of one of said wires is projected to the lower end of the passage in which it is mounted to contact the solution surrounding said root, the needle of said oscillator will move to a predetermined value on said scale of said oscillator which will correspond to an electrical value indicating that the lower end of said wire is exactly at the lower end of said passage in the root of said tooth model.

2. The teaching device according to claim 1 in which said wires are relatively stiff and the ends thereof which project beyond said cusp of said tooth model having finger engageable handle elements thereon to facilitate manipulation of said wires within said passages therefor.

3. The teaching device according to claim 1 in which said electrical circuit conductors comprise a pair of conductors, each respectively connected at one end to the positive and negative terminals of the oscillator, and electrical contact clips respectively affixed to opposite ends thereof, one of said conductors being adapted to be clipped to one of said wires and the clip on the other conductor being clipped to the metal ground element in said enclosure.

* * * * *